(12) United States Patent
Ruthard

(10) Patent No.: US 12,545,779 B2
(45) Date of Patent: Feb. 10, 2026

(54) STYRENIC COPOLYMER COMPOSITION WITH PMMA AND IMPROVED WEATHERING RESISTANCE

(71) Applicant: INEOS STYROLUTION GROUP GMBH, Frankfurt am Main (DE)

(72) Inventor: Christian Ruthard, Mainz (DE)

(73) Assignee: INEOS STYROLUTION GROUP GMBH, Frankfurt (DE)

( * ) Notice: Subject to any disclaimer, the term of this patent is extended or adjusted under 35 U.S.C. 154(b) by 380 days.

(21) Appl. No.: 17/768,134

(22) PCT Filed: Oct. 13, 2020

(86) PCT No.: PCT/EP2020/078786
§ 371 (c)(1),
(2) Date: Apr. 11, 2022

(87) PCT Pub. No.: WO2021/074154
PCT Pub. Date: Apr. 22, 2021

(65) Prior Publication Data
US 2024/0301191 A1    Sep. 12, 2024

(30) Foreign Application Priority Data

Oct. 15, 2019 (EP) .................... 19203362

(51) Int. Cl.
| | |
|---|---|
| C08L 25/12 | (2006.01) |
| C08J 3/20 | (2006.01) |
| C08K 3/04 | (2006.01) |
| C08K 5/3435 | (2006.01) |
| C08L 25/16 | (2006.01) |
| C08L 33/12 | (2006.01) |
| C08L 51/04 | (2006.01) |

(52) U.S. Cl.
CPC .............. *C08L 25/12* (2013.01); *C08J 3/203* (2013.01); *C08K 3/04* (2013.01); *C08K 5/3435* (2013.01); *C08L 25/16* (2013.01); *C08L 33/12* (2013.01); *C08L 51/04* (2013.01); *C08J 2325/12* (2013.01); *C08J 2433/12* (2013.01); *C08L 2201/08* (2013.01); *C08L 2205/035* (2013.01)

(58) Field of Classification Search
CPC .......... C08L 25/12; C08L 25/16; C08L 33/12; C08L 51/04; C08L 2201/08; C08L 2205/035; C08J 3/203; C08J 2325/12; C08J 2433/12; C08K 3/04; C08K 5/3435
See application file for complete search history.

(56) References Cited

U.S. PATENT DOCUMENTS

| | | | |
|---|---|---|---|
| 4,224,419 A | 9/1980 | Swoboda et al. | |
| 4,396,769 A | 8/1983 | Ferreira et al. | |
| 4,492,791 A | 1/1985 | Orban et al. | |
| 4,605,699 A | 8/1986 | Mitulla et al. | |
| 4,634,734 A | 1/1987 | Hambrecht et al. | |
| 4,692,486 A | 9/1987 | Gugumus | |
| 4,788,253 A | 11/1988 | Hambrecht et al. | |
| 9,701,813 B2 | 7/2017 | Minkwitz | |
| 10,294,348 B2 | 5/2019 | Minkwitz | |
| 2006/0069207 A1 † | 3/2006 | Dhawan | |
| 2012/0046408 A1 † | 2/2012 | Minkwitz | |
| 2015/0065622 A1 † | 3/2015 | Minkwitz | |
| 2016/0297957 A1 | 10/2016 | Boeckmann et al. | |
| 2017/0145201 A1 | 5/2017 | Boeckmann et al. | |
| 2019/0023892 A1 | 1/2019 | Kang | |
| 2019/0119481 A1 | 4/2019 | Michaelis De Vasconcellos et al. | |
| 2019/0119487 A1 | 4/2019 | Michaelis De Vasconcellos et al. | |

FOREIGN PATENT DOCUMENTS

| | | | |
|---|---|---|---|
| CN | 104072932 A | † | 10/2014 |
| CN | 105504569 A | † | 4/2016 |

(Continued)

OTHER PUBLICATIONS

Carlsson et al., "Decomposition of Polypropylene Hydroperoxide by Hindered Amines," Journal of Polymer Science. 1982. vol. 20, pp. 575-582.

(Continued)

*Primary Examiner* — Shane Fang
(74) *Attorney, Agent, or Firm* — RAPHAEL BELLUM PLLC

(57) ABSTRACT

The invention relates to a thermoplastic molding composition (P) comprising: (A) thermoplastic polymer composition (A) comprising: (A-1) 10 to 50 wt.-% of graft copolymer (A-1), (A-2) 1 to 50 wt.-%, of thermoplastic polymer matrix (A-2) based on one or more vinylaromatic copolymers, (A-3) 20 to 50 wt.-%, of polymerized alkyl methacrylate component (A-3), and (A-4) 0 to 45 wt.-% of comonomer which is copolymerized with the at least one polymerized alkyl methacrylate component (A-3), where the sum of (A-1), (A-2), (A-3) and optional comonomers (A-4) is 83.2 to 99.8 wt.-%; (B) a hindered amine light stabilizer composition (B), comprising at least two of substances (B-1) to (B-3): (B-1) 0 to 0.9 wt.-%, of at least one hindered amine light stabilizer having a dipiperidine structure with at least one alkyl group at each of the 2 and 6 positions of the dipiperidine structure (B-2) 0 to 0.9 wt.-%, of a hindered amine light stabilizer mixture having a monopiperidine structure with at least one alkyl group at each of the 2 and 6 positions of the monopiperidine structure, and (B-3) 0 to 2 wt.-%, of at least one hindered amine light stabilizer having a polymeric structure comprising piperidine groups with at least one alkyl group at each of the 2 and 6 positions of the piperidine groups (C) 0 to 5 wt.-%, of one or more further additives (C), different from (B); and (D) 0 to 10 wt.-%, of colorants, dyes and/or pigments (D), different from (C); wherein the constituents (A) to (D) sum up to 100 wt.-% of the molding composition (P).

14 Claims, No Drawings

(56) References Cited

FOREIGN PATENT DOCUMENTS

| | | | |
|---|---|---|---|
| CN | 109096673 A | 12/2018 |
| CN | 109312134 A | 2/2019 |
| CN | 109476895 A | 3/2019 |
| DE | 2826925 A1 | 1/1980 |
| DE | 3149358 A1 | 6/1983 |
| DE | 3414118 A1 | 10/1985 |
| DE | 10316198 A1 | 10/2003 |
| EP | 0093693 A2 | 11/1983 |
| EP | 2593510 B1 | 12/2016 |
| GB | 2387387 A | 10/2003 |
| KR | 100931573 B1 | 12/2009 |
| WO | 2012007268 A1 | 1/2012 |
| WO | 2015078751 A1 | 6/2015 |
| WO | 2015150223 A1 | 10/2015 |
| WO | 2019020680 A1 | 1/2019 |
| WO | 2019020686 A1 | 1/2019 |

OTHER PUBLICATIONS

Lange, "Bestimmung von Teilchengroben aus Trubung und Brechungsinkrement," Kolloid-Z. u. Z. Polymere, Band 223, Heft 1, 1967, pp. 24-30; see specification for relevancy at p. 11, lines 23-24.
Scholtan et al., "Bestimmung der Teilchengrobenverteilung von Latices mit der Ultrazentrifuge," Kolloid-Z. u. Z. Polymere 250, 1972, pp. 782-796; see specification for relevancy at p. 11, lines 25-26.
Wohlleben et al., "Measurement of Particle Size Distribution of Polymer Latexes," 2010, Editors: L. Gugliotta, J. Vegam p. 129-153.

† cited by third party

STYRENIC COPOLYMER COMPOSITION WITH PMMA AND IMPROVED WEATHERING RESISTANCE

Impact modified molding compositions, such as acrylonitrile styrene acrylate (ASA), and blends thereof with other thermoplastic polymers are widely used in many applications such as, e.g., in automotive industry, electronic industry or for household goods. The popularity of these thermoplastic polymer compositions may be attributed to their balanced properties of good impact strength, melt flow characteristics and high weathering stability.

A significant application area for ASA polymers are unpainted parts in exterior automotive applications such as front grills or side mirrors that are often colored in black. In such parts automotive producers require next to primary material properties such as impact and thermal properties also a certain stability of surface appearance upon exposure to UV light and weathering conditions over an extended period of time (several thousand hours). Often laboratory weathering exposure tests are used by automotive producers (such as Volkswagen) to simulate outdoor exposure over a period of years and thereafter surface appearance is often judged by changes of surface color or gloss level. Here the laboratory method PV3929 (on accelerated weathering and aging testing of polymers) represents one of the most demanding requirements that are most difficult to comply to.

Whereas in more traditional designs unpainted exterior automotive parts have been usually decorated with a grained and thus low gloss surface texture, there is a clear design trend in recent years for automotive exterior parts with a high gloss surface finish or with a combination of high and low gloss surface areas. This leads to a growing need for thermoplastic compositions with high stability of surface appearance of high gloss surface areas. High gloss surface areas in this invention are defined as surface areas with a gloss level above 75 gloss units determined at a measuring angle of 60° according to DIN EN ISO 2813 (e.g. 2015).

With the currently available state of the art technology in ASA polymers sufficient weathering stability of high gloss surfaces unfortunately cannot be achieved. The time until visible surface appearance changes appear is significantly shorter upon weathering of high gloss surfaces compared to grained surfaces.

UV stabilizers such as hindered amine light stabilizer (HALS) compounds or UV absorbers are often used in ASA formulations for use in exterior applications. Several documents, such as U.S. Pat. Nos. 4,692,486, 9,701,813, EP-B 2593510 and DE-A 10316198, teach HALS stabilizers and combinations thereof as UV absorbers and light stabilizers.

However, within our investigations we have found that ASA compositions using already described UV stabilizer formulations cannot meet the required combination of low mold deposit formation and high weathering resistance needed for high gloss exterior applications.

It was surprisingly found that the addition of poly(alkyl methacrylate) above a content of 20 wt.-%, based on the total weight, to a molding composition, in particular to an ASA formulation, is a very efficient method to improve the weathering stability of an ASA formulation upon exposing a unpainted high gloss surface part from this formulation for 3200 h to PV3929 conditions.

Accordingly, a first aspect of the present invention relates to a molding composition (P) comprising:
(A) at least one thermoplastic polymer composition (A) comprising:
  (A-1) 10 to 50 wt.-%, preferably 15 to 45 wt.-%, more preferably 20 to 45 wt.-%, based on the total weight of the molding composition (P), of at least one graft copolymer (A-1),
  (A-2) 1 to 50 wt.-%, preferably 5 to 50 wt.-%, based on the total weight of the molding composition (P), of at least one thermoplastic polymer matrix (A-2) based on one or more vinylaromatic copolymers,
  (A-3) 20 to 50 wt.-%, preferably 25 to 40 wt.-%, based on the total weight of the molding composition (P), of at least one polymerized alkyl methacrylate component (A-3), preferably methyl methacrylate present in one or more alkyl methacrylate homopolymers and/or alkyl methacrylate copolymers with one or more comonomer (A-4), and
  (A-4) 0 to 45 wt.-% based on the total weight of the molding composition (P), of at least on comonomer which is copolymerized with the at least one polymerized alkyl methacrylate component (A-3), the comonomer (A-4) being selected from vinylaromatic monomer, preferably styrene, or vinyl cyanide, preferably acrylonitrile, wherein the sum of (A-1), (A-2), (A-3) and optional comonomers (A-4) is 83.2 to 99.8 wt.-% based on the total weight of the molding composition (P);
(B) a hindered amine light stabilizer composition (B), comprising at least two of substances (B-1) to (B-3):
  (B-1) 0 to 0.9 wt.-%, preferably 0.1 to 0.9 wt.-%, more preferably 0.2 to 0.9 wt.-%, based on the total weight of the molding composition (P), of at least one hindered amine light stabilizer having a dipiperidine structure with at least one alkyl group at each of the 2 and 6 positions of the dipiperidine structure and not containing any saturated or unsaturated C12-C21 ester moieties (i.e. saturated or unsaturated ester moieties having 12 to 21 carbon atoms) at one of the 3, 4 or 5 positions of the piperidine structures, wherein the at least one hindered amine light stabilizer having a dipiperidine structure has a molecular weight of 200-550 g/mol,
  (B-2) 0 to 0.9 wt.-%, preferably 0.1 to 0.9 wt.-%, more preferably 0.2 to 0.9 wt.-%, in particular 0.2 to 0.6 wt.-%, based on the total weight of the molding composition (P), of a hindered amine light stabilizer mixture having a monopiperidine structure with at least one alkyl group at each of the 2 and 6 positions of the monopiperidine structure and saturated or unsaturated C12-C21 ester moieties at at least one of the 3, 4 or 5 positions of the monopiperidine structures, and
  (B-3) 0 to 2 wt.-%, preferably 0.1 to 2 wt.-%, more preferably 0.2 to 2 wt.-%, based on the total weight of the molding composition (P), of at least one hindered amine light stabilizer having a polymeric structure comprising piperidine groups with at least one alkyl group at each of the 2 and 6 positions of the piperidine groups and not containing any saturated or unsaturated C12-C21 ester moieties at one of the 3, 4 or 5 positions of the piperidine groups, wherein the at least one hindered amine light stabilizer having a polymeric structure has a molecular weight of 1000-4000 g/mol, preferably of 1500-4000 g/mol, more preferably 2000-4000 g/mol, provided that the at least one hindered amine light stabilizer composition (B) is present in the molding composition (P) in an amount of at least 0.2 wt.-%, based on the total weight of the molding composition (P);

(C) 0 to 5 wt.-%, preferably 0.05 to 5 wt.-% of one or more further additives (C), different from (B); and
(D) 0 to 10 wt.-%, preferably 0.1 to 10 wt.-% of colorants, dyes and/or pigments (D), different from (C);
wherein the constituents (A) to (D) sum up to 100 wt.-% of the molding composition (P).

Within the present application, the carbon atoms in the piperidine moieties and the positions to which the substituents are attached, respectively, are numbered according to the following general chemical structure, wherein the nitrogen atom is numbered as position 1:

The molding composition (P) comprises the thermoplastic polymer composition (A) and the components of the stabilizer composition (B).

In a further preferred embodiment, the invention relates to a molding composition (P), wherein the hindered amine light stabilizing composition (B) comprises:
(B-1) 0.1 to 0.9 wt.-%, preferably 0.2 to 0.9 wt.-%, more preferably 0.2 to 0.6 wt.-%, based on the total weight of the molding composition (P), of a compound represented by the chemical formula (I):

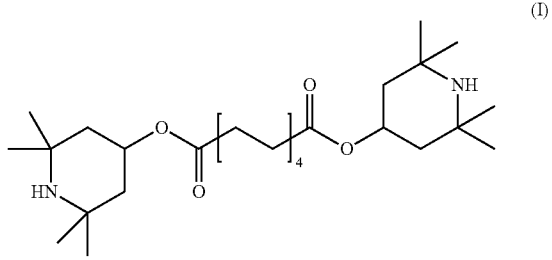

(I)

In a further preferred embodiment, the invention relates to a molding composition (P), wherein the hindered amine light stabilizing composition (B) comprises:
(B-2) 0.1 to 0.9 wt.-%, preferably 0.2 to 0.9 wt.-%, more preferably 0.2 to 0.6 wt.-% based on the total weight of the molding composition (P), of a compound represented by the chemical formula (II):

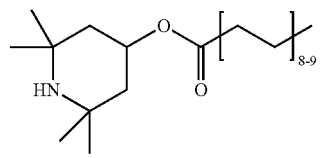

(II)

In a further preferred embodiment, the invention relates to a molding composition (P), wherein the hindered amine light stabilizing composition (B) comprises:
(B-3) 0 to 2.0 wt.-%, preferably 0.1 to 2.0 wt.-%, more preferably 0.2 to 2.0 wt.-%, in particular 0.2 to 1.0 wt.-%, based on the total weight of the molding composition (P), of a compound represented by the chemical formula (III):

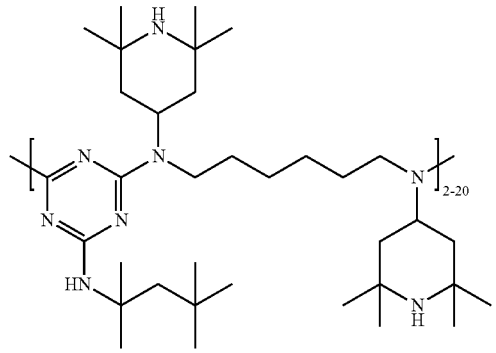

(III)

In a further embodiment, the invention relates to a molding composition (P) as previously defined, wherein the at least one graft copolymer (A-1) comprises or consist of an acrylonitrile styrene acrylate (ASA) copolymer comprising rubber particles having an average particle size $d_{50}$ of the rubber particles in the acrylonitrile styrene acrylate (ASA) copolymer from 50 to 1000 nm, wherein the average particle size is determined by scattered light measurement.

In a further embodiment, the invention relates to a molding composition (P) as previously defined, wherein the at least one thermoplastic matrix (A-2) comprises a copolymer which contains at least one type of vinyl cyanide repeating units and at least one type of vinylaromatic repeating units.

In a further embodiment, the invention relates to a molding composition (P) as previously defined, wherein the at least one thermoplastic polymer composition (A) comprises at least one copolymer (A-2) comprising: 18 to 45 wt.-% of at least one type of vinyl cyanide repeating units; and 55 to 82 wt.-% of at least one type of vinylaromatic repeating units.

In a further embodiment, the invention relates to a molding composition (P) as previously defined, wherein the graft copolymer (A-1) comprises a bimodal or trimodal size distribution of the rubber particles comprising:
(A-1a) at least one graft copolymer (A-1a) having an average particle size $d_{50}$ of the rubber particles in the ASA copolymer from 50 to 150 nm; and
(A-1b) at least one graft copolymer (A-1b) having an average particle size $d_{50}$ of the rubber particles in the ASA copolymer from 200 to 750 nm.

In a further embodiment, the invention relates to a molding composition (P) as previously defined, wherein the polymerized alky methacrylate component (A-3) comprises or consists of poly(alkyl methacrylate) polymer, preferably poly(methyl methacrylate) homo-polymer.

In an alternative embodiment, the invention relates to a molding composition (P) as previously defined, wherein the polymerized alky methacrylate component (A-3) comprises or consists of at least one copolymer of alkyl methacrylate monomer, preferably methyl methacrylate, and at least one type of vinylaromatic comonomers, preferably styrene, preferably a poly(styrene-methyl methacrylate) copolymer.

In a further alternative embodiment, the invention relates to a molding composition (P) as previously defined, wherein the polymerized alky methacrylate component (A-3) comprises or consists of at least one copolymer of alkyl methacrylate monomer, preferably methyl methacrylate, and at least one type of vinylaromatic comonomers, preferably styrene, and a vinyl cyanide, preferably acrylonitrile, and potential further comonomers, preferably a poly(styrene-acrylonitrile-methyl methacrylate) terpolymer.

In a further alternative embodiment, the invention relates to a molding composition (P) as previously defined, wherein a molded article produced from said molding composition (P) that exhibits a gloss level above 75 gloss units before any weathering exposure, exhibits a color shift dE as measured in reference to the unexposed surface of below dE=6, preferably below dE=3 after being subjected to artificial weathering according to PV3929 for 3200 h, wherein the gloss level is determined according to DIN EN ISO 2813 at a measuring angle of 60°.

In a further aspect, the invention relates to a method for producing the molding composition (P) previously described, the method comprising at least the following steps:
  (i) providing the components (A) to (D) in the predetermined amounts to a mixing device; and
  (ii) blending the components (A) to (D) in the mixing device at temperatures above the glass transition point of the components (A) to obtain the molding composition (P).

In a further aspect, the invention relates to a method for improving weathering resistance on high gloss surface molded articles (T) with gloss levels according to DIN EN ISO 2813 at a measuring angle of 60° above 75 gloss units on at least a part of the surface area of the molded article (T) before being subjected to artificial weathering, wherein said method comprises the step of compounding the constituents (A) to (D) as previously described, and wherein the high gloss surface molded article (T) obtained from the molding composition (P) exhibits the following properties:
  a color shift of the high gloss surface molded article (T) produced from the molding composition (P) subjected to artificial weathering according to PV3929 for 3200 h of below 25% of the color shift of a high gloss surface part produced from a comparative molding composition (P') molded and assessed with same conditions,
  wherein the comparative molding composition (P') is obtained by compounding the components (A) to (D) contained in the molding composition (P) as previously described, with a content of polymerized alkyl methacrylate component (A-3) below 20 wt.-% of the comparable molding composition (P').

In a further aspect, the invention relates to a molded article (T) comprising high gloss surface areas with gloss levels above 75 gloss units prepared from a thermoplastic molding composition (P) as previously described, wherein the gloss level is determined according to DIN EN ISO 2813 at a measuring angle of 60°.

In a further aspect, the invention relates to the use of a molded article (T) with high gloss surface areas with gloss levels above 75 gloss units prepared from a thermoplastic molding composition (P) as previously described, in unpainted exterior, preferably automotive applications, wherein the gloss level is determined according to DIN EN ISO 2813 at a measuring angle of 60°.

Graft Copolymer (Component A-1)

The molding composition (P) according to the present invention comprises (or consists of) at least one thermoplastic polymer composition (A) comprising at least one graft copolymer (A-1), at least one at least one thermoplastic matrix (A-2) based on one or more vinylaromatic copolymers, and at least one polymerized alkyl methacrylate component (A-3).

In a preferred embodiment, the graft copolymer (A-1) is a rubber-modified copolymer comprising repeating units of acrylonitrile and styrene. In a preferred embodiment, copolymers of acrylonitrile and styrene which are graft-polymerized on rubber particles derived from polymerizing a monomer composition comprising at least one conjugated diene monomer or at least one acrylate monomer are used.

In a further preferred embodiment, the at least one graft copolymer (A-1) used comprises (or consists of):
  A-1.1: from 20 to 90 wt.-%, preferably from 40 to 90 wt.-%, particularly preferably from 45 to 85 wt.-%, very particularly preferably from 50 to 80 wt.-%, based on the total weight of the graft copolymer (A-1), of a graft base of one or more monomers consisting of:
    A-1.11: 65 to 100 wt.-% or 65 to 99.99 wt.-%, preferably 75 to 99.99 wt.-%, particularly preferably 80 to 99.98 wt.-%, based on the total weight of the graft base (A-1.1), of at least one C1 to C8 alkyl(meth)acrylate, in particular n-butyl acrylate and/or 2-ethylhexyl acrylate,
    A-1.12: 0 to 35 wt.-%, preferably 0 to 25 wt.-%, particularly preferably 0 to 20 wt.-%, based on the total weight of the graft base (A-1.1), of at least one further comonomer selected from: styrene, α-methyl styrene, acrylonitrile, methacrylonitrile, methyl methacrylate, maleic acid anhydride and N-phenylmaleimide, preferably styrene and α-methyl styrene, particularly preferably styrene;
    A-1.13: from 0 to 10 wt.-% or 0.01 to 10 wt.-%, preferably from 0.01 to 5, particularly preferably from 0.02 to 2 wt.-%, based on the total weight of the graft base (A-1.1), of one or more polyfunctional crosslinking monomers, selected from allyl(meth)acrylate, divinylbenzene, diallylmaleate, diallylfumarate, diallylphthalate, triallylcyanurat, triallylisocyanurat and dihydrodicyclopentadienyl acrylate (DCPA), which, when component A-1.11 is acrylate, is present in amounts of at least 0.1 wt.-%;
  A-1.2: from 10 to 80 wt.-%, preferably from 10 to 60 wt.-%, more preferably from 15 to 55 wt.-%, very particularly preferably from 20 to 50 wt.-%, based on the total weight of the graft copolymer (A-1), of at least one graft layer of one or more monomers consisting of:
    A-1.21: from 65 to 95 wt.-%, preferably from 70 to 90 wt.-%, particularly preferably from 75 to 85 wt.-%, based on the total weight of the graft layer (A-1.2), of at least one vinylaromatic monomer, preferably styrene and/or α-methyl styrene, in particular styrene;
    A-1.22: 5 to 35 wt.-%, preferably 10 to 30 wt.-%, particularly preferably 15 to 25 wt.-%, based on the total weight of the graft layer (A-1.2), of acrylonitrile and/or methacrylonitrile, preferably acrylonitrile; and
  A-1.3: 0 to 30 wt.-%, preferably 0 to 20 wt.-%, particularly preferably 0 to 15 wt.-%, based on the total weight of the graft copolymer (A-1), of at least one further constituent selected from:
    at least one monoethylenically unsaturated monomer selected from: methyl methacrylate, maleic acid anhydride and N-phenylmaleimide, preferably methyl methacrylate and/or
    at least one molecular weight regulator, in particular a thiol-based molecular weight regulator such as tert-dodecylmercaptan.

Particular preferred polyfunctional crosslinking monomers A-1.13 are allyl(meth)acrylate and/or dihydrodicyclopentadienyl acrylate (DCPA), and more preferred DCPA.

Preferably, the graft copolymer (A-1) is typically prepared in an emulsion polymerization process or a suspension polymerization process. The graft base A-1.1, comprising (or consisting of) monomers A-1.11, A-1.12 and optionally A-1.13, as well as its preparation is known and described in the literature, e.g. DE-A 28 26 925, DE-A 31 49 358 and DE-A 34 14 118.

The graft polymerization reaction used to synthesize the graft shell A-1.2 may be conveniently done in the same vessel as the emulsion polymerization done for the synthesis of the graft base A-1.1. During the reaction, additives, like emulsifiers, pH buffers and initiators can be added. The monomers of the graft shell, especially monomers A-1.21 and A-1.22, can be added at once to the reaction mixture or stepwise in several steps, preferably in a continuous way, added during polymerization. When monomers A-1.21 and/or A-1.22 are added in several steps typically a multi-layered graft shell A-1.2 is obtained.

Suitable emulsifiers, buffers and initiators are described in WO 2015/150223 and WO 2015/078751.

In a preferred embodiment, the styrene-based graft copolymer (A-1) is acrylonitrile styrene acrylate (ASA) and mixtures thereof.

In a more preferred embodiment, the graft copolymer (A-1) according to the invention is particularly preferably an ASA copolymer comprising (or consisting of):

A-1.1: from 40 to 90 wt.-%, based on the total weight of the styrene-based graft copolymer (A-1), of a graft base consisting of:
  A-1.11: from 65 to 99.9 wt.-%, preferably from 90 to 99.5 wt.-%, based on the total weight of the graft base (A-1.1), of at least one C1 to C8 alkyl(meth)acrylate, preferably n-butyl acrylate and/or 2-ethylhexylacrylate, in particular n-butyl acrylate,
  A-1.12: 0 to 35 wt.-%, preferably 1 to 10 wt.-%, based on the total weight of the graft base (A-1.1), of styrene,
  A-1.13: 0.1 to 5 wt.-%, preferably 0.5 to 5 wt.-%, in particular 0.5 to 3 wt. %, most preferred 1 to 2.5 wt.-%, based on the total weight of the graft base (A-1.1), of at least one polyfunctional cross-linking monomer, selected from allyl(meth)acrylate, divinylbenzene, diallylmaleate, diallylfumarate, diallylphthalate, triallylcyanurat, triallylisocyanurat and dihydrodicyclopentadienyl acrylate (DCPA), preferably selected from allyl(meth)acrylate and DCPA, in particular DCPA, and
A-1.2: from 10 to 60 wt.-%, based on the total weight of the styrene-based graft copolymer (A-1), of a graft comprising (or consisting of):
  A-1.21: from 65 to 95 wt.-%, based on the total weight of the graft layer (A-1.2), of styrene;
  A-1.22: 5 to 35 wt.-%, based on the total weight of the graft layer (A-1.2), of acrylonitrile and
  A-1.3: 0 to 30 wt.-%, based on the total weight of the styrene-based graft copolymer (A-1), methyl methacrylate (MMA).

In a preferred embodiment, the at least one graft copolymer (A-1) is or comprises an acrylonitrile styrene acrylate (ASA) having an average particle size $d_{50}$ of the rubber particles in the ASA copolymer from 50 to 1000 nm, preferably from 60 to 600 nm, wherein the average particle size is determined by scattered light measurement.

Typically the mean particle diameter can be measured by scattered light measurement, i.e., determined by turbidity (Lange, Kolloid-Zeitschrift und Zeitschrift für Polymere, 1968, 223(1):24-30), or by ultracentrifugation (e.g. described in Scholtan and Lange, Kolloid-Zeitschrift und Zeitschrift für Polymere, 1972, 250(8):782-796), or using Hydrodynamic Chromatography HDC (e.g. described in W. Wohlleben, H. Schuch, "Measurement of Particle Size Distribution of Polymer Latexes", 2010, Editors: L. Gugliotta, J. Vega, p. 129-153).

In one preferred embodiment, the graft copolymer (A-1) comprises a binary or trinary size distribution comprising (or consisting of)

(A-1a) at least one graft copolymer (A-1a) having an average particle size $d_{50}$ of the rubber particles in the ASA copolymer from 50 to 150 nm; and (A-1b) at least one graft copolymer (A-1b) having an average particle size $d_{50}$ of the rubber particles in the ASA copolymer from 200 to 750 nm.

In a further preferred embodiment, the graft copolymer (A-1) comprises a binary or trinary size distribution comprising (or consisting of)

(A-1a) at least one graft copolymer (A-1a) having an average particle size $d_{50}$ of the rubber particles in the ASA copolymer from 50 to 150 nm or 70 to 100 nm; and (A-1b) at least one graft copolymer (A-1b) having an average particle size $d_{50}$ of the rubber particles in the ASA copolymer from 200 to 750 nm or 400 to 600 nm.

In a preferred embodiment, a first basic rubber latex (L1) may be obtained from (co)polymerizing butyl acrylate and one or more crosslinking agents (e.g., tricyclodecenyl acrylate) in an aqueous solution that may comprise further ingredients such as, e.g., one or more salts (e.g., C12- to C18-paraffin sulfonic acid and/or sodium bicarbonate). The temperature of the reaction may be, for example, in the range of from 55 to 70° C. In a preferred embodiment, a mass ratio of butyl acrylate:tricyclodecenyl acrylate in the range of from 10:1 to 100:1, preferably of from 40:1 to 80:1, is used for polymerization. The mass ratios and definitions of the components are preferably as described herein. More specific examples are also provided in the experimental section below.

In a preferred embodiment, a first graft rubber latex (component A-1a) may be obtained from (co)polymerizing a basic rubber latex (e.g., a first basic rubber latex L1 obtainable as described before) with styrene and acrylonitrile in an aqueous solution that may comprise further ingredients such as, e.g., one or more salts (e.g., sodium persulfate). The reaction temperature may be in the range of from 50 to 80° C. Optionally, the obtained graft latex may be coagulated. Coagulation may be achieved in a salt solution (e.g., a magnesium sulfate solution) at a temperature in the range of from 50 to 80° C. Coagulation may optionally be followed by sintering (e.g., at a temperature in the range of from 80 to 150° C.). The mass ratios and definitions of the components are preferably as described herein. More specific examples are also provided in the experimental section below.

In a preferred embodiment, a second basic rubber latex (L2) may be obtained from (co)polymerizing butyl acrylate and one or more crosslinking agents (e.g., tricyclodecenyl acrylate) in the presence of a first basic rubber latex such as that described as L1 above in an aqueous solution that may comprise further ingredients such as, e.g., one or more salts (e.g., sodium bicarbonate, sodium persulfate and/or C12- to C18-paraffin sulfonic acid). The temperature of the reaction may be, for example, in the range of from 55 to 70° C. In a preferred embodiment, a mass ratio of butyl acrylate:tricyclodecenyl acrylate in the range of from 10:1 to 100:1, preferably of from 40:1 to 80:1, is used for polymerization.

The mass ratios and definitions of the components are preferably as described herein. More specific examples are also provided in the experimental section below.

In a preferred embodiment, a second graft rubber latex (component A-1b) may be obtained from (co)polymerizing a basic rubber latex (e.g., a second basic rubber latex L2 obtainable as described before) with styrene and acrylonitrile in an aqueous solution that may comprise further ingredients such as, e.g., one or more salts (e.g., sodium persulfate). The reaction temperature may be in the range of from 50 to 80° C. Optionally, the obtained graft latex may be coagulated. Coagulation may be achieved in a salt solution (e.g., a magnesium sulfate solution) at a temperature in the range of from 70 to 99° C. Coagulation may optionally be followed by sintering (e.g., at a temperature in the range of from 80 to 150° C.). The mass ratios and definitions of the components are preferably as described herein. More specific examples are also provided in the experimental section below.

Thermoplastic Matrix (Component A-2)

In a preferred embodiment, the at least one thermoplastic matrix (A-2) comprises a copolymer which contains at least one vinyl cyanide repeating unit and at least one vinylaromatic repeating unit. In a preferred embodiment, throughout the present invention, the vinyl cyanide repeating unit is derived from acrylonitrile. In a preferred embodiment, throughout the present invention, the vinylaromatic repeating unit is derived from styrene, α-methyl styrene or a combination thereof.

In a more preferred embodiment, the at least one thermoplastic matrix (A-2) comprises a copolymer which contains acrylonitrile repeating units and at least one vinylaromatic repeating unit selected from styrene, α-methyl styrene and a combination thereof, in particular styrene. A copolymer that comprises or consists of acrylonitrile and styrene may also be designated as poly(styrene-acrylonitrile) (SAN). A copolymer that comprises or consists of acrylonitrile and α-methyl styrene may also be designated as poly(α-methyl styrene/acrylonitrile) (AMSAN).

Poly(styrene-acrylonitrile) (SAN) and/or poly(α-methyl styrene/acrylonitrile) (AMSAN) copolymers may be used as thermoplastic polymer (A-2). In general, any SAN and/or AMSAN copolymer known in in the art may be used within the subject-matter of the present invention.

In a preferred embodiment, the at least one thermoplastic polymer composition (A) comprises at least one copolymer (A-2) comprising (or consisting of):

18 to 45 wt.-% based on the total weight of (A-2), of at least one vinyl cyanide repeating unit, in particular acrylonitrile; and 55 to 82 wt.-% based on the total weight of (A-2), of at least one vinylaromatic repeating unit, in particular a vinylaromatic repeating unit derived from styrene and/or α-methyl styrene.

In a preferred embodiment, the SAN and AMSAN copolymers of the present invention contain:

from 50 to 99 wt.-%, based on the total weight of the SAN and/or AMSAN copolymer, of at least one member selected from the group consisting of styrene and α-methyl styrene; and from 1 to 50 wt.-%, based on the total weight of the SAN and/or AMSAN copolymer, of acrylonitrile.

The weight average molecular weight (as determined by gel permeation chromatography relative to polystyrene as standard) of the SAN or AMSAN copolymer may be in the range of 15,000 to 200,000 g/mol, preferably in the range of 30,000 to 150,000 g/mol.

In a preferred embodiment, the ratios by weight of the components making up the SAN or AMSAN copolymer are 60 to 95 wt.-%, based on the total weight of the SAN and/or AMSAN copolymer, of styrene and/or α-methyl styrene, and 40 to 5 wt.-%, based on the total weight of the SAN and/or AMSAN copolymer, of acrylonitrile.

In a preferred embodiment, SAN or AMSAN containing proportions of incorporated acrylonitrile monomer units of <36 wt.-%, based on the total weight of the SAN and/or AMSAN copolymer may be used.

In a preferred embodiment, copolymers of styrene with acrylonitrile of the SAN or AMSAN type incorporating comparatively little acrylonitrile (not more than 35 wt.-%, based on the total weight of the SAN and/or AMSAN copolymer) are used.

Among the afore-mentioned, most preferred SAN or AMSAN copolymers are those having a viscosity number VN (determined according to DIN 53726 at 25° C., 0.5% by weight in dimethylformamide) of from 50 to 120 ml/g are in particular preferred.

As used herein, as far as not otherwise defined, all measurement norms such as, e.g., DIN norms and PV norms, preferably refer to the version that was up-to-date in August 2019.

The copolymers of SAN or AMSAN component are known and the methods for their preparation, for instance, by radical polymerization, more particularly by emulsion, suspension, solution and bulk polymerization are also well documented in the literature.

Polymerized Alkyl Methacylate (Component (A-3)) and Potential Comonomers

Any poly(alkyl methacrylate) homopolymer is suitable to be employed as component (A-3) within the scope of this invention. Particularly suitable are poly(alkyl methacrylates) wherein the alkyl group is represented by saturated linear or branched C1 to C10 alkyl groups, preferably linear or branched C1 to C5 alkyl groups, more preferably linear or branched C1 to C3 alkyl groups, and mixtures thereof. In a more preferred embodiment, the alkyl group is selected from a methyl group and an ethyl group. Thus, in one embodiment of the invention, the poly(alkyl methacrylate) is selected from poly(methyl methacrylate), poly(ethyl methacrylate), and mixtures thereof.

In a more preferred embodiment of the invention, the poly(alkyl methacrylate) comprises or consists of poly(methyl methacrylate). Poly(methyl methacrylate) that is commercially available from the company Evonik (Germany) with tradenames such as Plexiglas® 6N, Plexiglas® 7N or Plexiglas® 8N.

Beside the above described poly(alkyl methacrylate) homopolymers, component (A-3) can also comprise or consist of copolymers of polymerizable alkyl methacrylates with polymerizabel vinylaromatic comonomers and/or vinyl cyanide comonomers.

Suitable polymerizable alkyl methacrylates comprise alkyl methacrylates wherein the alkyl group is represented by saturated linear or branched C1 to C10 alkyl groups, preferably linear or branched C1 to C5 alkyl groups, more preferably linear or branched C1 to C3 alkyl groups, and mixtures thereof.

Suitable vinylaromatic comonomers comprise in particular styrene, alpha methylstyrene, and mixtures thereof. In a preferred embodiment, the vinylaromatic comonomer is styrene. Suitable vinylaromatic comonomers comprise in particular acrylonitrile.

In a preferred embodiment, the component (A-3) comprises or consist of poly(methyl methacrylate).

In a further preferred embodiment, the component (A-3) comprises or consist of poly(styrene-methyl methacrylate) (SMMA). The SMMA may have any monomer moiety composition mainly composed of styrene and methyl methacrylate moieties. In a preferred embodiment, the at least one SMMA contains 20 to 80 wt.-% styrene, preferably 30 to 80 wt.-% styrene, more preferably 40 to 80 wt.-% styrene, even more preferably 50 to 80 wt.-% styrene. The SMMA may be a random polymer or a block polymer. In a preferred embodiment, the at least one SMMA is a random polymer.

In a further preferred embodiment, the component (A-3) comprises or consist of poly(styrene-acrylonitrile-methyl methacrylate) terpolymer. Preferably, the terpolymer comprises 20 to 75 wt.-%, preferably 40 to 70 wt.-%, more preferably 65 to 70 wt.-% methyl methacrylate, and 10 to 50 wt.-%, preferably 20 to 30 wt.-% styrene and 0.05 to 10%, more preferably 7 to 10 wt.-% acrylonitrile.

In a further preferred embodiment, the component (A-3) comprises a mixture of at least two polymers selected from poly(methyl methacrylate), poly(styrene-methyl methacrylate) (SMMA) and poly(styrene-acrylonitrile-methyl methacrylate) terpolymer.

Thermoplastic Polymer Composition (A)

In a preferred embodiment, the at least one thermoplastic polymer composition (A) comprises (or consists of):
- (A-1) 10 to 50 wt.-%, preferably 15 to 45 wt.-%, more preferably 20 to 45 wt.-%, based on the total weight of the molding composition (P), of at least one graft copolymer (A-1);
- (A-2) 1 to 50 wt.-%, preferably 5 to 50 wt.-%, based on the total weight of the molding composition (P), of at least one thermoplastic polymer matrix (A-2) based on one or more vinylaromatic copolymers; and
- (A-3) 20 to 50 wt.-%, preferably 25 to 40 wt.-%, based on the total weight of the molding composition (P), of at least one polymerized alkyl methacrylate component (A-3), preferably methyl methacrylate present in one or more alkyl methacrylate homopolymers and/or alkyl methacrylate copolymers with one or more comonomer (A-4), and
- (A-4) 0 to 45 wt.-% based on the total weight of the molding composition (P), of at least on comonomer which is copolymerized with the at least one polymerized alkyl methacrylate component (A-3), the comonomer (A-4) being selected from vinylaromatic monomer, preferably styrene, or vinyl cyanide, preferably acrylonitrile,
- where the sum of (A-1), (A-2), (A-3) and optional comonomers (A-4) is 83.2 to 99.8 wt.-% based on the total weight of the molding composition (P).

In another preferred embodiment, the at least one thermoplastic polymer composition (A) comprises (or consists of):
- (A-1) 10 to 50 wt.-%, preferably 15 to 45 wt.-%, more preferably 20 to 45 wt.-%, based on the total weight of the molding composition (P), of at least one graft copolymer (A-1);
- (A-2) 1 to 50 wt.-%, preferably 5 to 50 wt.-%, based on the total weight of the molding composition (P), of at least one thermoplastic polymer matrix (A-2) based on one or more vinylaromatic copolymers; and
- (A-3) 20 to 50 wt.-%, preferably 25 to 40 wt.-%, based on the total weight of the molding composition (P), of at least one polymerized alkyl methacrylate component (A-3), preferably methyl methacrylate present in one or more alkyl methacrylate homopolymers;

wherein the amounts of (A-1), (A-2), and (A-3) sum up to 100 wt.-% of (A);

In another preferred embodiment, the at least one thermoplastic polymer composition (A) comprises (or consists of):
- (A-1) 10 to 50 wt.-%, preferably 15 to 45 wt.-%, more preferably 20 to 45 wt.-%, based on the total weight of the molding composition (A), of at least one graft copolymer (A-1);
- (A-2) 1 to 50 wt.-%, preferably 5 to 50 wt.-%, based on the total weight of the thermoplastic polymer composition (A), of at least one molding matrix (A-2) based on one or more vinylaromatic copolymers;
- (A-3) 20 to 50 wt.-%, preferably 25 to 40 wt.-%, based on the total weight of the molding composition (A), of at least one polymerized alkyl methacrylate component (A-3), preferably methyl methacrylate present in one or more alkyl methacrylate copolymers with one or more comonomer (A-4); and
- (A-4) 1 to 45 wt.-%, based on the total weight of the molding composition (P), of at least one comonomer (A-4) selected from vinylaromatic monomer, preferably styrene, or vinyl cyanide, preferably acrylonitrile, wherein the comonomer (A-3) is copolymerized with the polymerized alkyl methacrylate component (A-3) to form a copolymer;
- wherein the sum of (A-1), (A-2), (A-3) and optional comonomers (A-4) is 83.2 to 99.8 wt.-% based on the total weight of the molding composition (P).

In another preferred embodiment, the at least one thermoplastic polymer composition (A) comprises (or consists of):
- (A-1) 10 to 50 wt.-%, preferably 15 to 45 wt.-%, more preferably 20 to 45 wt.-%, based on the total weight of the molding composition (P), of at least one graft copolymer (A-1);
- (A-2) 1 to 50 wt.-%, preferably 5 to 50 wt.-%, based on the total weight of the molding composition (P), of at least one thermoplastic polymer matrix (A-2) based on one or more vinylaromatic copolymers;
- (A-3) 20 to 50 wt.-%, preferably 25 to 40 wt.-%, based on the total weight of the molding composition (P), of at least one polymerized alkyl methacrylate component (A-3), preferably methyl methacrylate present in a mixture of one or more alkyl methacrylate homopolymers and one or more alkyl methacrylate copolymer with one or more comonomer (A-4); and
- (A-4) 1 to 45 wt.-%, based on the total weight of the molding composition (P), of at least one comonomer (A-4) selected from vinylaromatic monomer, preferably styrene, or vinyl cyanide, preferably acrylonitrile, wherein the comonomer (A-3) is copolymerized with the polymerized alkyl methacrylate component (A-3) to form a copolymer;
- wherein the sum of (A-1), (A-2), (A-3) and optional comonomers (A-4) is 83.2 to 99.8 wt.-% based on the total weight of the molding composition (P).

Hindered Amine Light Stabilizing Composition (Component B)

According to the present invention, the molding composition (P) comprises at least one hindered amine light stabilizing composition (B) comprising at least two of substances (B-1) to (B-3):
- (B-1) 0 to 0.9 wt.-%, preferably 0.1 to 0.9 wt.-%, more preferably 0.2 to 0.9 wt.-%, based on the total weight of the molding composition (P), of at least one hindered amine light stabilizer having a dipiperidine structure with at least one alkyl group at each of the 2 and 6 positions of the dipiperidine structure and not containing any saturated or unsaturated C12-C21 ester moieties at one of the 3, 4 or 5 positions of the piperidine structures wherein the at least one hindered amine light stabilizer having a dipiperidine structure has a molecular weight of 200-550 g/mol, (B-2) 0 to 0.9 wt.-%, preferably 0.1 to 0.9 wt.-%, more preferably 0.2 to 0.9 wt.-%, in particular 0.2 to 0.6 wt.-%, based on the total weight of the molding composition (P), of a hindered amine light stabilizer mixture having a monopiperidine structure with at least one alkyl group at each of the 2 and 6 positions of the monopiperidine structure and saturated or unsaturated C12-C21 ester moieties at at least one of the 3, 4 or 5 positions of the monopiperidine structures, and (B-3) 0 to 2 wt.-%, preferably 0.1 to 2 wt.-%, more preferably 0.2 to 2 wt.-%, based on the total weight of the molding composition (P), of at least one hindered amine light stabilizer having a polymeric structure comprising piperidine groups with at least one alkyl group at each of the 2 and 6 positions of the piperidine groups and not containing any saturated or unsaturated C12-C21 ester moieties at one of the 3, 4 or 5 positions of the piperidine groups, wherein the at least one hindered amine light stabilizer having a polymeric structure has a molecular weight of 1000-4000 g/mol, preferably of 1500-4000 g/mol, more preferably 2000-4000 g/mol, provided that the at least one hindered amine light stabilizer composition (B) is present in the molding composition (P) in an amount of at least 0.2 wt.-%, based on the total weight of the molding composition (P)

wherein the sum of (B-1), (B-2), and (B-3) adds to 100 wt.-% of the total weight of the at least one hindered amine light stabilizer composition (B).

Suitable hindered amine light stabilizers are substances including piperidine structures with at least one alkyl group at each of the 2 and 6 positions of the piperidine structures. Particular preferred are compounds having piperidine structures with two alkyl groups at each of the 2 and 6 positions. In a more preferred embodiment, the alkyl groups are selected from C1-C5 alkyl groups, in particular C1-C3 alkyl groups.

The hindered amine light stabilizer (B-1) of the molding composition (P) in accordance with the present invention is at least one compound having a dipiperidine structure with at least one alkyl group at each of the 2 and 6 positions of the dipiperidine structure and not containing any saturated or unsaturated C12-C21 ester moieties at one of the 3, 4 or 5 positions of the piperidine structures wherein the at least one hindered amine light stabilizer having a dipiperidine structure has a molecular weight of 200-550 g/mol. Suitable hindered amine light stabilizer (B-1) comprise compounds comprising two piperidine structures which are connected via C3-C11-saturated or -unsaturated diester moieties which are bound to one of the 3, 4 or 5 position of the piperidine structures.

In a further preferred embodiment, the hindered amine light stabilizer (B-1) comprise compounds comprising two piperidine structures which are connected via C3-C11-saturated diester moieties, in particular C6-C10-saturated diester moieties, which are bound to one of the 3, 4 or 5 position of the piperidine structures. and not containing any saturated or unsaturated C12-C21 ester moieties at one of the 3, 4 or 5 positions of the piperidine structures.

A particular preferred hindered amine light stabilizer having a dipiperidine structure suitable to be used as component (B-1) according to the present invention is represented by the chemical formula (II):

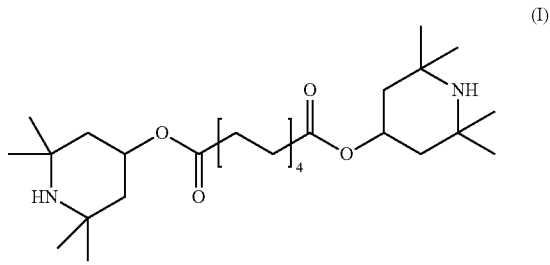

(I)

This sterically hindered amine (bis(2,2,6,6-tetramethylpiperidin-4-yl) sebacate, CAS number 52829-07-9) and production thereof are known to the person skilled in the art and are described in the literature (see by way of example U.S. Pat. No. 4,396,769 and the references cited therein). It is marketed as Tinuvin® 770 by BASF SE and has a molecular weight of 481 g/mol.

Other suitable examples for component (B-1) are: bis(1,2,2,6,6-pentamethyl-4-piperidyl) sebacate (CAS 41556-26-7, Tinuvin® 765 by BASF SE, molecular weight (MW)=509 g/mol); N, N'-bisformyl-N, N'-bis-(2,2,6,6-tetramethyl-4-piperidinyl)-hexamethylendiamine (CAS 124172-53-8, Uvinul® 4050 H by BASF SE, MW=450 g/mol); N,N'-bis(2,2,6,6-tetramethyl-4-piperidyl)isophthalamide (CAS 42774-15-2, Nylostab® S-EED® by Clariant, MW=443 g/mol).

The hindered amine light stabilizer (B-2) of the molding composition (P) in accordance with the present invention is at least one compound having a monopiperidine structure with at least one alkyl group at each of the 2 and 6 positions of the monopiperidine structure and saturated or unsaturated C12-C21 ester moieties at at least one of the 3, 4 or 5 positions of the monopiperidine structures. Such hindered amine stabilizers can be present as mixture of substances with different fatty acid chains. Preferably, the ester moieties comprise or consist of saturated ester moieties. Even more preferably, the ester moieties comprise or consist of C15-C20-saturated ester moieties at at least one of the 3, 4 or 5 positions of the monopiperidine structures, in particular at least at the 4 position.

A particular preferred hindered amine light stabilizer having a monopiperidine structure suitable to be used as component (B-2) according to the present invention is represented by the chemical formula (I):

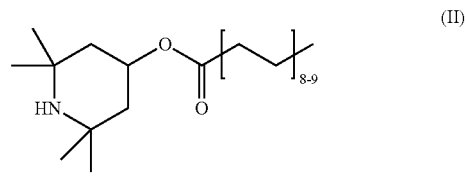

(II)

This sterically hindered amine (2,2,6,6-tetramethyl-4-piperidinyl stearate, CAS number 167078-06-0, or 86403-32-9, or 24860-22-8) and production thereof are known to the person skilled in the art and described in the literature (Carlsson et al., Can. Journal of Polymer Science, Polymer Chemistry Edition (1982), 20(2), 575-82). It is marketed as Cyasorb® UV-3853 by the company Solvay. This substance with a molecular weight below 516 g/mol is a waxy and sticky product with melting temperature at around 30° C. As dosage in pure solid form in compounding of thermoplastic compositions represents a technical hurdle this product is usually supplied and used as master batch. In a preferred embodiment the substance is thus added in form of a master batch comprising 20 to 70 wt.-%, preferably 40 to 60 wt.-%, based on the total weight of the master batch, of 2,2,6,6-tetramethyl-4-piperidinyl stearate and a copolymer of a vinylaromatic olefin and acrylonitrile as matrix polymer. Preferably, the matrix polymer is selected from poly(styrene-acrylonitrile) (SAN), poly(α-methyl styrene/acrylonitrile) (AMSAN), and/or poly(styrene-methyl methacrylate) (SMMA).

The hindered amine light stabilizer (B-3) of the molding composition (P) in accordance with the present invention is at least one compound having a polymeric structure comprising piperidine groups with at least one alkyl group at each of the 2 and 6 positions of the piperidine groups and not containing any saturated or unsaturated C12-C21 ester moieties at one of the 3, 4 or 5 positions of the piperidine groups. The hindered amine light stabilizer (B-3) having a polymeric structure is defined as a compound comprising at least two, preferably at least three, repeating units derivable from polymerizable monomers and having a molecular weight of 1000-4000 g/mol, preferably of 1500-4000 g/mol, more preferably 2000-4000 g/mol.

A particular preferred hindered amine light stabilizer having a having a polymeric structure comprising piperidine groups suitable to be used as component (B-3) according to the present invention is represented by the chemical formula (III):

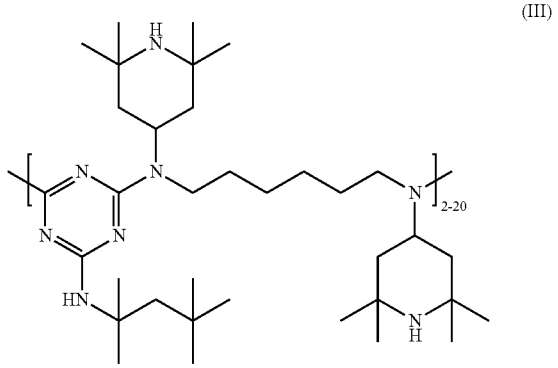

This sterically hindered amine (CAS number 71878-19-8) and production thereof are known to the person skilled in the art and are described in the literature (see by way of example EP-A-93 693 and the references cited therein). It is marketed as Chimassorb® 944 by BASF SE with a molecular weight of 2100-3000 g/mol.

Other suitable examples for component (B-3) are: 1,6-Hexanediamine,N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine (CAS 192268-64-7, Chimassorb® 2020 by BASF SE, MW=2600-3400 g/mol); Butanedioic acid, dimethylester, polymer with 4-hydroxy-2,2,6,6-tetramethyl-1-piperidine ethanol (CAS 65447-77-0, Tinuvin® 622 by BASF SE, MW=3100-4000 g/mol); Alkenes, C20-24 alpha-, polymers with maleic anhydride, reaction products with 2,2,6,6-tetramethyl-4-piperidinamine (CAS 152261-33-1, Uvinul® 5050 H by BASF SE, MW=3000-4000 g/mol); 1,3,5-Triazine-2,4,6-triamine, N2,N2''-1,2-ethanediylbis[N2-[3-[4,6-bis[butyl(1,2,2,6,6-pentamethyl-4-piperidinyl)amino]-1,3,5-triazin-2-yl]amino]propyl]-N',N''-dibutyl-N',N''-bis(1,2,2,6,6-pentamethyl-4-piperidinyl)- (CAS 106990-43-6, Sabostab® UV 119 by SABO S.p.A., MW=2286 g/mol); Poly[(6-morpholino-s-triazine-2,4-diyl)[2,2,6,6-tetramethyl-4-piperidyl)imino]-hexamethylene [(2,2,6,6-tetramethyl-4-piperidyl)imino]] (CAS 82451-48-7 or 90751-07-8, Cyasorb® UV-3346 by Solvay, MW=1600 g/mol); 1,6-Hexanediamine, N, N'-bis (2,2,6,6-tetramethyl-4-piperidinyl)-polymers with morpholine-2,4,6-trichloro1,3,5-triazine (CAS 193098-40-7 or 219920-30-6, Cyasorb® UV-3529 by Solvay).

The hindered amine light stabilizer (B-1) is optionally present in the molding composition in an amount of 0 to 0.9 wt.-%, preferably 0.1 to 0.9 wt.-%, more preferably 0.2 to 0.9 wt.-%, more preferably 0.2 to 0.6 wt.-%, in particular 0.4 to 0.6 wt.-%, based on the total weight of the molding composition (P).

The hindered amine light stabilizer (B-2) is optionally present in the molding composition in an amount of 0 to 0.9 wt.-%, preferably 0.1 to 0.9 wt.-%, more preferably 0.2 to 0.9 wt.-%, more preferably 0.2 to 0.6 wt.-%, in particular 0.2 to 0.5 wt.-%, based on the total weight of the molding composition (P).

The hindered amine light stabilizer (B-3) is optionally present in the molding composition in an amount of 0 to 2.0 wt.-%, preferably 0.1 to 2.0 wt.-%, more preferably 0.2 to 2.0 wt.-%, in particular 0.2 to 1.0 wt.-%, based on the total weight of the molding composition (P).

In one embodiment, the invention relates to a molding composition (P), wherein the hindered amine light stabilizing composition (B) comprises:

(B-1) 0 to 0.9 wt.-%, preferably 0.1 to 0.9 wt.-%, more preferably 0.2 to 0.9 wt.-%, more preferably 0.2 to 0.6 wt.-%, in particular 0.4 to 0.6 wt.-%, based on the total weight of the molding composition (P), of a compound represented by the chemical formula (I):

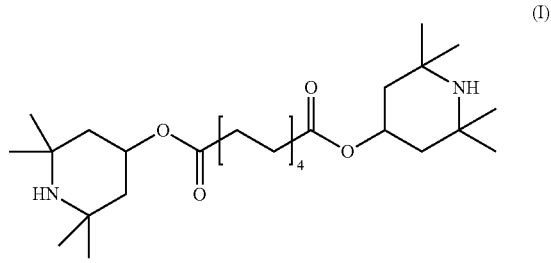

In one embodiment, the invention relates to a molding composition (P), wherein the hindered amine light stabilizing composition (B) comprises:

(B-2) 0 to 0.9 wt.-%, preferably 0.1 to 0.9 wt.-%, more preferably 0.2 to 0.9 wt.-%, more preferably 0.2 to 0.6 wt.-%, in particular 0.2 to 0.5 wt.-%, based on the total weight of the molding composition (P), of a composition comprising at least one compound represented by the chemical formula (II):

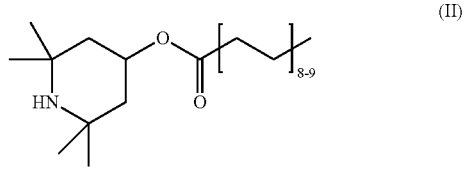

(II)

In one embodiment, the invention relates to a molding composition (P), wherein the hindered amine light stabilizing composition (B) comprises:

(B-3) 0 to 2.0 wt.-%, preferably 0.1 to 2.0 wt.-%, more preferably 0.2 to 2.0 wt.-%, in particular 0.2 to 1.0 wt.-%, based on the total weight of the molding composition (P), of a compound represented by the chemical formula (III):

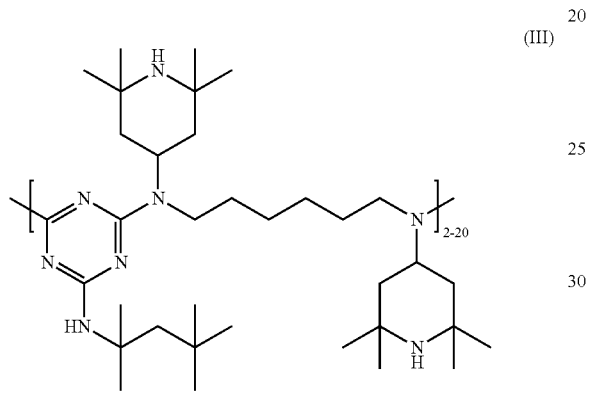

(III)

In one embodiment of the invention, the molding composition (P) comprises at least one hindered amine light stabilizing composition (B) comprising:

(B-1) 0.1 to 0.9 wt.-%, preferably 0.2 to 0.9 wt.-%, more preferably 0.2 to 0.6 wt.-%, in particular 0.4 to 0.6 wt.-%, based on the total weight of the molding composition (P), of at least one hindered amine light stabilizer having a dipiperidine structure with at least one alkyl group at each of the 2 and 6 positions of the dipiperidine structure and not containing any saturated or unsaturated C12-C21 ester moieties at one of the 3, 4 or 5 positions of the piperidine structures wherein the at least one hindered amine light stabilizer having a dipiperidine structure has a molecular weight of 200-550 g/mol, (B-2) 0.1 to 0.9 wt.-%, preferably 0.2 to 0.9 wt.-%, more preferably 0.2 to 0.6 wt.-%, in particular 0.2 to 0.5 wt.-%, based on the total weight of the molding composition (P), of a hindered amine light stabilizer mixture having a monopiperidine structure with at least one alkyl group at each of the 2 and 6 positions of the monopiperidine structure and saturated or unsaturated C12-C21 ester moieties at at least one of the 3, 4 or 5 positions of the monopiperidine structures, and (B-3) 0 to 2.0 wt.-%, preferably 0.1 to 2.0 wt.-%, more preferably 0.2 to 2.0 wt.-%, in particular 0.2 to 1.0 wt.-%, based on the total weight of the molding composition (P), of at least one hindered amine light stabilizer having a polymeric structure comprising piperidine groups with at least one alkyl group at each of the 2 and 6 positions of the piperidine groups and not containing any saturated or unsaturated C12-C21 ester moieties at one of the 3, 4 or 5 positions of the piperidine groups, wherein the at least one hindered amine light stabilizer having a polymeric structure has a molecular weight of 1000-4000 g/mol, preferably of 1500-4000 g/mol, more preferably 2000-4000 g/mol.

In one embodiment of the invention, the molding composition (P) comprises at least one hindered amine light stabilizing composition (B) comprising: (B-1) 0.1 to 0.9 wt.-%, preferably 0.2 to 0.9 wt.-%, more preferably 0.2 to 0.6 wt.-%, in particular 0.4 to 0.6 wt.-%, based on the total weight of the molding composition (P), of a compound represented by the chemical formula (I):

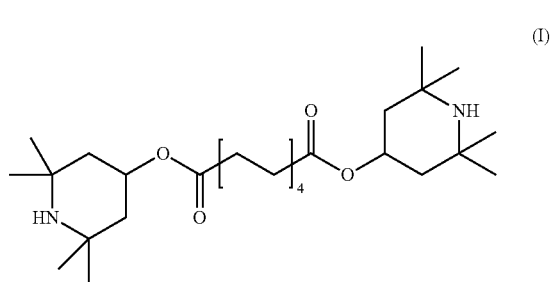

(I)

(B-2) 0.1 to 0.9 wt.-%, preferably 0.2 to 0.9 wt.-%, more preferably 0.2 to 0.6 wt.-%, in particular 0.2 to 0.5 wt.-%, based on the total weight of the molding composition (P), of a composition comprising at least one compound represented by the chemical formula (II):

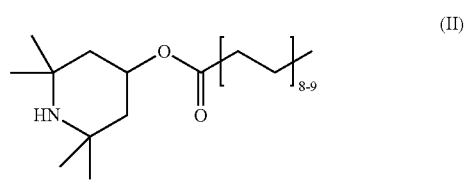

(II)

and (B-3) 0 to 2.0 wt.-%, preferably 0.1 to 2.0 wt.-%, more preferably 0.2 to 2.0 wt.-%, in particular 0.2 to 1.0 wt.-%, based on the total weight of the molding composition (P), of at least one hindered amine light stabilizer having a polymeric structure comprising piperidine groups with at least one alkyl group at each of the 2 and 6 positions of the piperidine groups and not containing any saturated or unsaturated C12-C21 ester moieties at one of the 3, 4 or 5 positions of the piperidine groups, wherein the at least one hindered amine light stabilizer having a polymeric structure has a molecular weight of 1000-4000 g/mol, preferably of 1500-4000 g/mol, more preferably 2000-4000 g/mol, preferably a compound represented by the chemical formula (III):

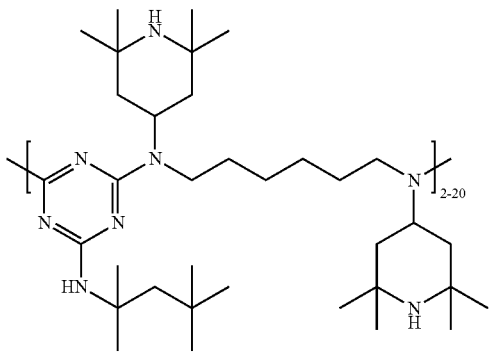

(III)

The at least one hindered amine light stabilizer composition (B) is present in the molding composition (P) in an amount of at least 0.2 wt.-%, preferably 0.3 wt.-%, in particular 0.4 wt.-% based on the total weight of the molding composition (P). However, the at least one hindered amine light stabilizer composition (B) is present in the molding composition (P) in an amount of at most 4.0 wt.-%, preferably 3.0 wt.-%, based on the total weight of the molding composition (P).

Further Additives (Optional Component C)

As used herein, the one or more further additives (C) may be any additives usable in molding composition (P) and not described in any of the components (A), (B) or (D). For example, a further additive (C) may be selected from the group consisting of plasticizers, aliphatic amide waxes, aliphatic fatty acid esters, and further UV stabilizers that are not listed as component (B).

Optionally, various additives may be added to the molding compounds in amounts of from 0 to 5 wt.-%, often 0.1 to 5 wt.-%, as assistants and processing additives. Suitable added additives (C) include all substances customarily employed for processing or finishing the polymers.

Additives (C) may be added in form of master batches comprising additives (C) in a polymer matrix. In a preferred embodiment, the additives (C) are added in form of a master batch comprising 20 to 70 wt.-%, preferably 40 to 60 wt.-%, based on the total amount of the master batch, of additives (C) or mixtures thereof and 30 to 80 wt.-%, preferably 40 to 60 wt.-%, based on the total amount of the master batch, a copolymer of an vinylaromatic olefin and acrylonitrile as matrix polymer. Preferably, the matrix polymer is selected from poly(styrene-acrylonitrile) (SAN), poly(α-methyl styrene/acrylonitrile) (AMSAN), and/or poly(styrene-methyl methacrylate) (SMMA).

Examples of additives (C) include, for example, antistatic agents, antioxidants, flame retardants, stabilizers for improving thermal stability, stabilizers for increasing photostability, stabilizers for enhancing hydrolysis resistance and chemical resistance, antithermal decomposition agents and in particular lubricants that are useful for production of molded bodies/articles. These further added substances may be admixed at any stage of the manufacturing operation, but preferably at an early stage in order to profit early on from the stabilizing effects (or other specific effects) of the added substance.

Examples of suitable antistatic agents include amine derivatives such as N,N-bis(hydroxyalkyl)alkylamines or -alkyleneamines, polyethylene glycol esters, copolymers of ethylene oxide glycol and propylene oxide glycol (in particular two-block or three-block copolymers of ethylene oxide blocks and propylene oxide blocks), and glycerol mono- and distearates, and mixtures thereof.

Examples of suitable antioxidants include sterically hindered monocyclic or polycyclic phenolic antioxidants which may comprise various substitutions and may also be bridged by substituents. These include not only monomeric but also oligomeric compounds, which may be constructed of a plurality of phenolic units. Hydroquinones and hydroquinone analogs are also suitable, as are substituted compounds, and also antioxidants based on tocopherols and derivatives thereof. It is also possible to use mixtures of different antioxidants. It is possible in principle to use any compounds which are customary in the trade or suitable for styrene copolymers, for example antioxidants from the Irganox® range. In addition to the phenolic antioxidants cited above by way of example, it is also possible to use so-called co-stabilizers, in particular phosphorus- or sulfur-containing co-stabilizers. These phosphorus- or sulfur-containing co-stabilizers are known to those skilled in the art.

Examples of suitable flame retardants that may be used include the halogen-containing or phosphorus-containing compounds known to the person skilled in the art, magnesium hydroxide, and also other commonly used compounds, or mixtures thereof.

Examples of suitable light stabilizers include various substituted resorcinols, salicylates, benzotriazoles and benzophenones.

Suitable matting agents include not only inorganic substances such as talc, glass beads or metal carbonates (for example $MgCO_3$, $CaCO_3$) but also polymer particles, in particular spherical particles having diameters $D_{50}$ greater than 1 μm, based on, for example, methyl methacrylate, styrene compounds, acrylonitrile or mixtures thereof. It is further also possible to use polymers comprising copolymerized acidic and/or basic monomers.

Examples of suitable antidrip agents include polytetrafluoroethylene (Teflon) polymers and ultrahigh molecular weight polystyrene (weight-average molar mass Mw above 2,000,000 g/mol).

Examples of fibrous/pulverulent fillers include carbon or glass fibers in the form of glass fabrics, glass mats, or filament glass rovings, chopped glass, glass beads, and wollastonite, particular preference being given to glass fibers. When glass fibers are used, they may be finished with a sizing and a coupling agent to improve compatibility with the blend components. The glass fibers incorporated may either take the form of short glass fibers or else continuous filaments (rovings).

Examples of suitable particulate fillers include carbon black, amorphous silica, magnesium carbonate, powdered quartz, mica, bentonites, talc, feldspar or, in particular, calcium silicates, such as wollastonite, and kaolin.

Examples of suitable stabilizers include hindered phenols but also vitamin E and/or compounds having analogous structures and also butylated condensation products of p-cresol and dicyclopentadiene. Other HALS stabilizers (hindered amine light stabilizers) not listed above as component B, benzophenones, resorcinols, salicylates, benzotriazoles are also suitable.

Other suitable compounds include, for example, thiocarboxylic esters. Also usable are $C_6$-$C_{20}$ alkyl esters of thiopropionic acid, in particular the stearyl esters and lauryl esters.

It is also possible to use the dilauryl ester of thiodipropionic acid (dilauryl thiodipropionate), the distearyl ester of thiodipropionic acid (distearyl thiodipropionate) or mixtures thereof. Examples of further additives include UV absorbers such as 2H-benzotriazol-2-yl-(4-methylphenol).

Suitable lubricants and demolding agents include stearic acids, stearyl alcohol, stearic esters, polyolefin waxes and/or generally higher fatty acids, derivatives thereof and corresponding fatty acid mixtures comprising 1 to 45 carbon atoms. In a further preferred embodiment, the composition comprises amide compounds having the formula $R^1$—CONH—$R^2$, wherein $R^1$ and $R^2$ are each independently selected from aliphatic, saturated or unsaturated hydrocarbon groups having 1 to 30 carbon atoms, preferably 12 to 24 carbon atoms, in particular 16 to 20 carbon atoms. In a further preferred embodiment of the invention, the composition may additionally comprise fatty acid ester compounds having the formula $R^3$—CO—$OR^4$, wherein $R^3$ and $R^4$ are each independently selected from aliphatic, saturated or unsaturated hydrocarbon groups having 1 to 45 carbon atoms, preferably 15 to 40 carbon atoms, in particular 25 to 35 carbon atoms. Also particularly suitable is ethylene-bis (stearamide).

In a further preferred embodiment, the molding composition (P) may comprise an organic, inorganic or mixed phosphate, in particular an alkaline metal or earth alkaline metal phosphate such as $Ca_3(PO_4)_2$ and/or an organophosphate having alkyl or aryl groups comprising 1 to 12 carbon atoms.

In a further preferred embodiment, molding composition (P) may further comprise a polyester modified polysiloxane, in particular a polyester-polysiloxane-block copolymer, preferably a [polyester-b-polysiloxane-b-polyester] triblock copolymer. Preferred examples of the polysiloxane moieties comprised in the polyester-polysiloxaneblockcopolymer are derived from poly(dimethylsiloxane), poly(diethylsiloxane), poly(dipropylsiloxane), poly(dibutylsiloxane), and mixtures thereof.

Colorants, Dyes and Pigments (Optional Component D)

As indicated above, the molding mass (P) may further comprise 0 to 5 wt.-%, often 0.1 to 3 wt.-% of further dyes, pigments, or colorants which may be added in form of master batches comprising the dyes, pigments, or colorants in a polymer matrix. In a preferred embodiment, the dyes, pigments, or colorants are added in form of a master batch comprising 20 to 70 wt.-%, based on the total amount of the master batch, of dyes, pigments, colorants or mixtures thereof and 30 to 80 wt.-% based on the total amount of the master batch, a copolymer of an vinylaromatic olefin and acrylonitrile as matrix polymer. Preferably, the matrix polymer is selected from poly(styrene-acrylonitrile) (SAN), poly (α-methyl styrene/acrylonitrile) (AMSAN), and/or poly(styrene-methyl methacrylate) (SMMA).

Examples of suitable pigments as optional Component (D) include titanium dioxide, phthalocyanines, ultramarine blue, iron oxides and carbon black, and also the entire class of organic pigments. Examples of suitable colorants include all dyes that may be used for the transparent, semi-transparent, or non-transparent coloring of polymers, in particular those suitable for coloring styrene copolymers.

Preparation of the Molding Composition (P)

The method according to the present invention may have any procedural steps suitable for conducting the claimed method.

In a preferred embodiment, the step of compounding the components comprises at least the following steps:
(i) providing the components (A) to (D) in the predetermined amounts to an optionally heatable mixing device; and
(ii) blending the components (A) to (E) in the optionally heatable mixing device at temperatures above the glass transition point of the components (A) to (D) to obtain the molding composition (P).

Optionally, a step in which a homogenous particulate material mixture is prepared from the components (A) to (D) may be carried out prior to step (ii). However, also when provided to the optionally heatable mixing device without previous mixing, a homogenous mixing is typically achieved in the optionally heatable mixing device.

Each of components (A) to (D)—as far as solid—may be provided in form of particulate materials having different particle sizes and particle size distributions (e.g., as pellets, granules and/or powders).

The particulate materials (A) to (D) may be provided to a mixing device in the required amounts and ratios as previously indicated and optionally mixed prior to the blending step (ii) in order to obtain a homogenous particulate material mixture. In a preferred embodiment, this may require 1 to 60, preferably 1 to 20, in particular 2 to 10 minutes, depending to the amount of particulate material to be mixed.

The thus obtained homogenous particulate material mixture is then transferred to an optionally heatable mixing apparatus and blended therein, producing a substantially liquid-melt polymer mixture.

"Substantially liquid-melt" means that the polymer mixture, as well as the predominant liquid-melt (softened) fraction, may further comprise a certain fraction of solid constituents, examples being unmelted fillers and reinforcing material such as glass fibers, metal flakes, or else unmelted pigments, colorants, etc. "Liquid-melt" means that the polymer mixture is at least of low fluidity, therefore having softened at least to an extent that it has plastic properties.

Mixing apparatuses used are those known by the person skilled in the art. Components (A) and (B), and—where included—(C), and/or (D) may be mixed, for example, by joint extrusion, kneading, or rolling, the aforementioned components necessarily having been isolated from the aqueous dispersion or from the aqueous solution obtained in the polymerization.

Examples of mixing apparatus for implementing the method include discontinuously operating, heated internal kneading devices with or without RAM, continuously operating kneaders, such as continuous internal kneaders, screw kneaders with axially oscillating screws, Banbury kneaders, furthermore extruders, and also roll mills, mixing roll mills with heated rollers, and calenders.

Optionally, the method may comprise a further step (iii) of cooling the blend obtained from step (ii) to temperatures below the glass transition point of the components (A) to (D) to obtain the molding composition (P).

A preferred mixing apparatus used is an extruder or a kneader. Particularly suitable for melt extrusion are, for example, single-screw or twin-screw extruders. A twin-screw extruder is preferred. In some cases, the mechanical energy introduced by the mixing apparatus in the course of mixing is enough to cause the mixture to melt, meaning that the mixing apparatus does not have to be heated. Otherwise, the mixing apparatus is generally heated.

The temperature is guided by the chemical and physical properties of the styrene-based polymer composition (A) and the components (B), (C), and (D) and should be selected such as to result in a substantially liquid-melt polymer mixture. On the other hand, the temperature is not to be unnecessarily high, in order to prevent thermal damage of the polymer mixture. The mechanical energy introduced may, however, also be high enough that the mixing apparatus may even require cooling. Mixing apparatus is operated customarily at 150 to 400, preferably 170 to 300° C.

In a preferred embodiment, a heatable twin-screw extruder and a speed of 50 to 150 rpm, preferably 60 to 100 rpm is employed. In a preferred embodiment, an extruding temperature of 170 to 270° C., preferably 210 to 250° C. is employed to obtain the molding composition (P). The molding composition (P) may be directly used, e.g. in molding processes, preferably injection molding processes, or may be processed to form granules which may be subjected to molding processes afterwards. The molding processes are preferably carried out at temperatures of 170 to 270° C., in particular 210 to 250° C. to result in a molded article.

Processing may be carried out using the known processes for thermoplastic processing, in particular production may be effected by thermoforming, extruding, injection molding, calendaring, blow molding, compression molding, press sintering, deep drawing or sintering, preferably by injection molding.

Applications and Properties

The present invention further relates to an article, in particular a molded article (T), prepared from a molding composition (P) or a polymer composition, comprising a molding composition (P) in combination with a further thermoplastic polymer as described above. The article, in particular the molded article, may be prepared by any known processes for thermoplastic processing. In particular preparation may be effected by thermoforming, extruding, injection molding, calendaring, blow molding, compression molding, press sintering, deep drawing or sintering, preferably by injection molding.

In particular, the molding composition (P) according to the invention may preferably be used for preparing a molded article (T) comprising high gloss surface areas with gloss levels above 75 gloss units prepared from a thermoplastic molding composition (P) as previously described, wherein the gloss level is determined according to DIN EN ISO 2813 at a measuring angle of 60°.

Thus, the invention also relates to a molded article (T) prepared from the molding composition (P), in particular a molded article (T) comprising high gloss surface areas with gloss levels above 75 gloss units prepared from a thermoplastic molding composition (P) as previously described, wherein the gloss level is determined according to DIN EN ISO 2813 at a measuring angle of 60°.

The molding composition (P) and the article, in particular the molded article (T), may be advantageously used for the manufacture of components or articles for electronic devices, household goods and exterior and/or interior automotive parts, in particular for the manufacture of visible components or articles. A preferred application is the use of unpainted exterior automotive parts such as front grills or side mirrors.

Molded articles (T) with high gloss surface areas with gloss levels above 75 gloss units prepared from a thermoplastic molding composition (P) as previously described, in unpainted exterior, preferably automotive applications, wherein the gloss level is determined according to DIN EN ISO 2813 at a measuring angle of 60°. However, preferred applications may be found in unpainted exterior applications, preferably automotive applications.

Automotive producers using unpainted high gloss parts in exterior applications usually require that the surface experiences only minor appearance changes after 3200 h weathering with e.g. PV3929 conditions. Maximum acceptable appearance changes are usually accepted by automotive producers in the range of a color shift of dE<6 and thus this criterion shall be applied as definition of acceptable appearance change within this invention.

The molding composition (P) according to the present invention is characterized by its specific properties with respect to the quality of a high gloss surface area on a molded article (T) produced from said molding composition (P) after being subjected to artificial weathering. In particular, said high gloss surface area that exhibits a gloss level above 75 gloss units before any weathering exposure, exhibits a color shift dE as measured in reference to the unexposed surface of below dE=6, preferably below dE=3 after being subjected to artificial weathering according to PV3929 for 3200 h, wherein the gloss level is determined according to DIN EN ISO 2813 at a measuring angle of 60°.

The invention also relates to a for improving weathering resistance on high gloss surface molded articles (T) with gloss levels according to DIN EN ISO 2813 at a measuring angle of 60° above 75 gloss units on at least a part of the surface area of the molded article (T) before being subjected to artificial weathering, wherein said method comprises the step of compounding the constituents (A) to (D) as previously described, and wherein the high gloss surface molded article (T) obtained from the molding composition (P) exhibits the following properties:

a color shift of the high gloss surface molded article (T) produced from the molding composition (P) subjected to artificial weathering according to PV3929 for 3200 h of below 25% of the color shift of a high gloss surface part produced from a comparative molding composition (P') molded and assessed with same conditions, wherein the comparative molding composition (P') is obtained by compounding the components (A) to (D) contained in the molding composition (P) as previously described, with a content of polymerized alkyl methacrylate component (A-3) below 20 wt.-% of the comparable molding composition (P').

The invention is further illustrated by the claims and examples.

EXAMPLES

Components
  Component A: The thermoplastic polymer composition (A) is an acrylonitrile styrene acrylate (ASA), i.e., an impact modified poly(styrene-acrylonitrile) (SAN) comprising SAN grafted on a butyl acrylate (BA) core (BA-g-SAN) (A-1a) and (A-1b) with the below-specified properties.
    Thermoplastic matrix polymer component A-2a: AMSAN (30 wt.-% ACN, 70 wt.-% α-methyl styrene, VN 57 ml/g)
    Thermoplastic matrix polymer component A-2b: SAN (35% ACN, VN 80 ml/g)
    Thermoplastic matrix polymer component A-3: Poly(methyl methacrylate): Plexiglas® 6N from Evonik
  Component B1: hindered amine light stabilizer (HALS) Tinuvin® 770 from BASF
  Component B2: hindered amine light stabilizer (HALS) Cyasorb® UV-3853 from Solvay as 50 wt.-% master batch in AMSAM (30 wt.-% acrylonitrile, 70 wt.-% α-methyl styrene, viscosity number 57 ml/g)
  Component C1: hindered amine light stabilizer (HALS) Chimassorb® 944 from BASF
  Component C2: Bis(2-propylheptyl)phthalate (DPHP) is a plasticizer.

Component D1: Carbon black Black Pearls® 880 from Cabot as 30 wt.-% master batch in SAN with 24% acrylonitrile and viscosity number 64 ml/g Comparative Component E:

Rotec® PMMA U470 in deep black color, commercially available from Romira GmbH. Rotec PMMA U470 according to the technical datasheet from Romira is a PMMA compound. The material is impact modified as can be seen by TEM imaging but does not contain any acrylonitrile and thus ASA as can be seen from the absence of a respective signal in IR within the wave number band 2210 cm-1 to 2260 cm-1.

The material is advertised by Romira GmbH for use in black unpainted high gloss automotive exterior applications.

Preparation of Basic Rubber Latex L1:

The reaction vessel was charged with 90.2 parts by weight of demineralized water, 0.61 parts by weight of the sodium salt of a C12- to C18-paraffin sulfonic acid and 0.23 parts by weight sodium bicarbonate. When the temperature in the reaction vessel reached 59° C., 0.16 parts by weight of sodium persulfate, dissolved in 5 parts by weight of demineralized water, were added. A mixture of 59.51 parts by weight butyl acrylate and 1.21 parts by weight tricyclodecenyl acrylate were added within a period of 210 min. Afterwards the reaction was continued for 60 min. Finally, the polymer dispersion had a total solid content of 39.6% and the latex particles had a particle diameter of 75 nm (determined by turbidity).

Preparation of Graft Rubber Latex (Component A-1a):

An amount of 151.9 parts by weight of the basic latex were added to the reaction vessel together with 92.2 parts by weight of demineralized water and 0.14 parts by weight of sodium persulfate, dissolved in 3.22 parts by weight of demineralized water. Within a period of 190 min a mixture of 31.18 parts by weight of styrene and 9.31 parts by weight of acrylonitrile were added at a temperature of 61° C., followed by a post polymerization time of 60 min at 65° C.

A polymer dispersion with a total solid content of 35.5% was obtained. The latex particles had a diameter 87 nm (determined by turbidity). After synthesis, the latex was coagulated with magnesium sulfate solution at a temperature of approximately 60° C., followed by a sintering step at approximately 90° C. The resulting slurry was centrifuged yielding a wet rubber powder which was further processed.

Preparation of Basic Rubber Latex L2:

The reaction vessel was charged with 70.66 parts by weight of demineralized water, 0.3 parts by weight of latex L1 and 0.23 parts by weight of sodium bicarbonate. After heating the reaction vessel to 60° C., 0.16 parts by weight of sodium persulfate, dissolved in 5 parts by weight demineralized water, were added to the reaction mixture. A mixture of 59.51 parts by weight butyl acrylate and 1.21 parts by weight tricyclodecenyl acrylate were added within a period of 210 min.

In parallel to the first feed a solution of 0.36 parts by weight of the sodium salt of a C12- to C18-paraffin sulfonic acid in 16.6 parts by weight demineralized water were also added over a period of 210 min. After 200 min, from starting the feed, the temperature is ramped to 65° C. Afterwards the reaction was continued for 60 min at 65° C. Finally, the polymer dispersion had a total solid content of 39.4% and the latex particles have a particle diameter of 440 nm (determined by turbidity).

Preparation of Graft Rubber Latex (Component A-1b):

An amount of 154 parts by weight of the basic latex were added to the reaction vessel together with 88.29 parts by weight of demineralized water, 0.11 parts by weight of the sodium salt of a C12- to C18-paraffin sulfonic acid and 0.14 parts by weight of sodium persulfate, dissolved in 5.61 parts by weight of demineralized water. The reaction mixture was heated to 61° C. Within a period of 60 min 13.16 parts by weight are added at a temperature of 61° C., followed by a post polymerization time of 90 min, where the temperature was increased from 61 to 65° C.

Then a mixture of 20.5 parts by weight of styrene and 6.83 parts by weight of acrylonitrile were added to the reaction over a period of 150 min. The reaction was continued at 65° C. for another 60 min. A polymer dispersion with a total solid content of 35.2% was obtained. The latex particles had a diameter 500 nm (determined by turbidity). After synthesis the latex was coagulated with magnesium sulfate solution at a temperature of approximately 88° C., followed by a sintering step at approximately 130° C. The resulting slurry was centrifuged yielding a wet rubber powder which was further processed Preparation of Molding Composition (P) and Sample Plaques Examples and Comparative Examples of molding compositions were prepared by compounding all constituents using a twin screw extruder (model ZSK26MC, Coperion GmbH, length: 1035 mm) at Tm=240° C. according to the specific ratios given in Table 1. Sample plaques (approximately 7,5×5 cm) and other samples have been prepared via injection molding (Tm: 260° C.).

TABLE 1

Compounding recipes

| in wt.-% | Comp. Ex. 1 | Comp. Ex. 2 | Comp. Ex. 3 | Comp. Ex. 4 | Comp. Ex. 5 | Comp. Ex. 6 | Ex. 1 |
|---|---|---|---|---|---|---|---|
| A-1a: (90 nm, BA-g-SAN) | 19.6 | 19.6 | 19.5 | 19.5 | 19.5 | — | 19.6 |
| A-1b: (500 nm, BA-g-SAN) | 12.9 | 12.9 | 12.9 | 12.9 | 12.9 | — | 12.9 |
| A-2a: AMSAN (30 wt.-% ACN, 70 wt.-% α-methyl styrene, VN 57 ml/g) | 28.8 | — | 28.8 | 28.8 | 28.7 | — | — |
| A-2b: SAN (35% ACN, VN 80 ml/g) | 33.6 | 62.5 | 33.5 | 33.5 | 33.4 | — | 33.0 |
| A-3: PMMA | — | — | — | — | — | — | 29.4 |
| B1: Tinuvin 770 | 0.49 | 0.49 | 0.49 | 0.29 | 0.29 | — | 0.49 |
| B2: Cyasorb 3853 as 50 % MB in AMSAM (30 wt.-% ACN, 70 wt.-% α-methyl styrene, VN 57 ml/g) (Cyasorb content) | 0.59 (0.29) | 0.59 (0.29) | 0.59 (0.29) | 0.59 (0.29) | 0.58 (0.29) | — | 0.59 (0.29) |

TABLE 1-continued

| Compounding recipes | | | | | | | |
|---|---|---|---|---|---|---|---|
| in wt.-% | Comp. Ex. 1 | Comp. Ex. 2 | Comp. Ex. 3 | Comp. Ex. 4 | Comp. Ex. 5 | Comp. Ex. 6 | Ex. 1 |
| C1: Chimassorb 944 | — | — | 0.29 | 0.59 | 0.78 | — | — |
| C2: Plasticiser DPHP | — | — | 0.05 | 0.05 | 0.05 | — | — |
| D1: Carbon black (as 30 wt.-% MB in SAN 24% ACN, VN 64) (carbon black content) | 3.92 (1.18) | 3.92 (1.18) | 3.90 (1.17) | 3.90 (1.17) | 3.89 (1.17) | — | 3.92 (1.18) |
| E: Rotec ® PMMA U470 deep black | — | — | — | — | — | 100 | — |

Examples and molding compounds with the prefix "comp-" are for comparison

Examples and Molding Compounds with Prefix "Comp-" are for Comparison

Herein, each BA-g-SAN (i.e., components A-1a and A-1b) comprises approximately 60 parts n-butyl acrylate (BA) containing a cross-linking agent, approximately 40 parts SAN (mass ratio styrene:acrylonitrile 1:3 to 1:4), and approximately 1 part of a further monomer such as, e.g., dihydrodicyclopentadienyl acrylate (DCPA) or tricyclodecenyl acrylate.

Weathering Conditions

The properties of the sample plaques were tested with respect to weathering conditions according to the following proceedings.

Volkswagen standard PV 3929 (simulation of dry hot climate):
 black standard 90±2° C. (dry phase: 50±2° C.), relative humidity: 20±10%;
 irradiation: 0.6 W/m$^2$ at a wavelength of 340 nm The test results were evaluated by color measurements according to DIN 6174, gloss measurement according to DIN EN ISO 2813 at a measuring angle of 60°. All references to gloss levels and gloss measurements in this invention are understood to be measured acc. to these conditions. The results of the evaluation are given in Table 2.

The color shifts are above dE=10 and thus not satisfying the technical requirements for exterior automotive applications and showing the need for further improvement.

The weathering results after 3200 h exposure according to PV3929 shown in Table 1 for high gloss plaques of Comp Ex. 6 representing a non-inventive poly(methyl methacrylate) compound with a content of component (A-3) above 20 wt.-% but without containing components (A-1) and (A-2) show color shifts above dE=7 not satisfying the technical demand outlined above.

The weathering results shown in Table 1 for high gloss plaques after 3200 h exposure according to PV3929 exposure for the inventive Ex. 1 surprisingly show a significant improvement of weathering results compared to the comparative examples. For Ex. 1 after 3200 h color shift dE is below dE=2.

The measured color shift dE for the inventive examples Ex. 1 is below 25% of the measured color shift for the comparative examples Comp. Ex. 1 and Comp. Ex. 2. With the high gloss weathering stability after 3200 h of the examples of the inventive formulation the technical demand outlined in this invention for high gloss surfaces can be answered.

TABLE 2

| Weathering results | | | | | | | |
|---|---|---|---|---|---|---|---|
| in wt.-% | Comp. Ex. 1 | Comp. Ex. 2 | Comp. Ex. 3 | Comp. Ex. 4 | Comp. Ex. 5 | Comp. Ex. 6 | Ex. 1 |
| A-1a: (90 nm, BA-g-SAN) | 19.6 | 19.6 | 19.5 | 19.5 | 19.5 | — | 19.6 |
| A-1b: (500 nm, BA-g-SAN) | 12.9 | 12.9 | 12.9 | 12.9 | 12.9 | — | 12.9 |
| A-2a: AMSAN (30 wt.-% ACN, 70 wt.-% α-methyl styrene, VN 57 ml/g) | 28.8 | | 28.8 | 28.8 | 28.7 | — | |
| A-2b: SAN (35% ACN, VN 80 ml/g) | 33.6 | 62.5 | 33.5 | 33.5 | 33.4 | — | 33.0 |
| A-3: PMMA | — | — | — | — | — | — | 29.4 |
| E: Rotec ® PMMA U470 deep black | — | — | — | — | — | 100 | — |
| Color Shift dE after artificial weathering according to PV3929 | | | | | | | |
| 1600 h | 2.3 | 6.3 | 9.7 | 7.3 | 6.9 | 4.4 | 0.5 |
| 2400 h | 12.2 | 17.5 | 13.4 | 5.1 | 3.9 | 5.8 | 1.0 |
| 3200 h | 17.5 | 17.3 | 14.1 | 13.8 | 11.8 | 7.1 | 1.2 |

The weathering results after 3200 h exposure according to PV3929 shown in Table 1 for high gloss plaques for all comparative examples (Comp. Ex. 1 to Comp. Ex. 5) with content of component (A-3) below 20 wt.-%, based on the total weight of the composition, show unsatisfying results even though the formulations are well stabilized with respect to UV irradiation.

The invention claimed is:
1. A thermoplastic molding composition (P) comprising:
(A) at least one thermoplastic polymer composition (A) comprising:
(A-1) 10 to 50 wt.-%, based on the total weight of the molding composition (P), of at least one graft copolymer (A-1), wherein the graft copolymer (A-1) is a rubber-modified copolymer comprising repeating units of acrylonitrile and styrene, (A-2) 1 to 50 wt.-%, based on the total weight of the molding composition (P), of at least one thermoplastic polymer matrix (A-2) based on one or more vinylaromatic copolymers, and (A-3) 20 to 50 wt.-%, based on the total weight of the molding composition (P), of at least one polymerized alkyl methacrylate component (A-3) selected from poly(alkyl methacrylate) homopolymers, where the sum of (A-1), (A-2), and (A-3) is 83.2 to 99.8 wt.-% based on the total weight of the molding composition (P);

(B) a hindered amine light stabilizer composition (B), comprising at least two of substances (B-1) to (B-3):

(B-1) 0 to 0.9 wt.-%, based on the total weight of the molding composition (P), of at least one hindered amine light stabilizer having a dipiperidine structure with at least one alkyl group at each of the 2 and 6 positions of the dipiperidine structure and not containing any saturated or unsaturated C12-C21 ester moieties at one of the 3, 4 or 5 positions of the piperidine structures, wherein the at least one hindered amine light stabilizer having a dipiperidine structure has a molecular weight of 200-550 g/mol, (B-2) 0 to 0.9 wt.-%, based on the total weight of the molding composition (P), of a hindered amine light stabilizer mixture having a monopiperidine structure with at least one alkyl group at each of the 2 and 6 positions of the monopiperidine structure and saturated or unsaturated C12-C21 ester moieties at at least one of the 3, 4 or 5 positions of the monopiperidine structures, and (B-3) 0 to 2 wt.-%, based on the total weight of the molding composition (P), of at least one hindered amine light stabilizer having a polymeric structure comprising piperidine groups with at least one alkyl group at each of the 2 and 6 positions of the piperidine groups and not containing any saturated or unsaturated C12-C21 ester moieties at one of the 3, 4 or 5 positions of the piperidine groups, wherein the at least one hindered amine light stabilizer having a polymeric structure has a molecular weight of 1000-4000 g/mol, provided that the at least one hindered amine light stabilizer composition (B) is present in the molding composition (P) in an amount of at least 0.2 wt.-%, based on the total weight of the molding composition (P);

(C) 0 to 5 wt.-% of one or more further additives (C), different from (B); and (D) 0 to 10 wt.-% of colorants, dyes, and/or pigments (D), different from (C);

wherein the constituents (A) to (D) sum up to 100 wt.-% of the molding composition (P).

2. The molding composition (P) according to claim 1, wherein the at least two substances (B-1) to (B-3) of the hindered amine light stabilizing composition (B) comprises:
one or both of substances (B-2) and (B-3); and
(B-1) 0.1 to 0.9 wt.-%, based on the total weight of the molding composition (P), of a compound represented by the chemical formula (I):

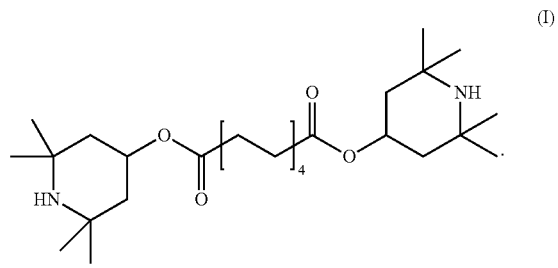

3. The molding composition (P) according to claim 1, wherein the at least two substances (B-1) to (B-3) of the hindered amine light stabilizing composition (B) comprises:
one or both substances (B-1) and (B-3); and
(B-2) 0.1 to 0.9 wt.-%, based on the total weight of the molding composition (P), of a compound represented by the chemical formula (II):

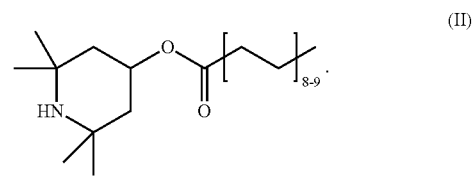

4. The molding composition (P) according to claim 1, wherein the at least two substances (B-1) to (B-3) of the hindered amine light stabilizing composition (B) comprises:
one or both substances (B-1) and (B-2); and
(B-3) 0 to 2.0 wt.-%, based on the total weight of the molding composition (P), of a compound represented by the chemical formula (III):

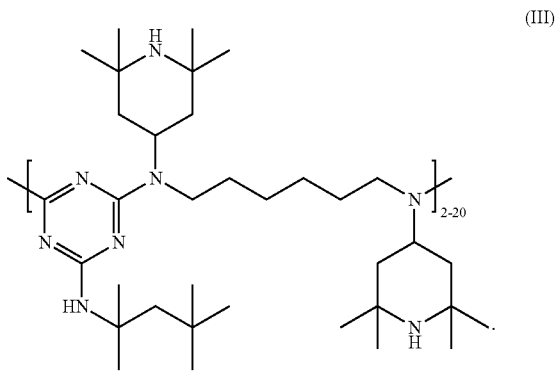

5. The molding composition (P) according to claim 1, wherein the at least one thermoplastic matrix (A-2) comprises a copolymer which contains at least one type of vinyl cyanide repeating units and at least one type of vinylaromatic repeating units.

6. The molding composition (P) according to claim 1, wherein the at least one thermoplastic polymer composition (A) comprises at least one copolymer (A-2) comprising:
18 to 45 wt.-% of at least one type of vinyl cyanide repeating units; and
55 to 82 wt.-% of at least one type of vinylaromatic repeating units.

7. The molding composition (P) according to claim 1, wherein the graft copolymer (A-1) comprises a bimodal or trimodal size distribution of the rubber particles comprising:
(A-1a) at least one graft copolymer (A-1a) having an average particle size $d_{50}$ of the rubber particles in the ASA copolymer from 50 to 150 nm; and
(A-1b) at least one graft copolymer (A-1b) having an average particle size $d_{50}$ of the rubber particles in the ASA copolymer from 200 to 750 nm.

8. The molding composition (P) according to claim 1, wherein a molded article produced from the molding composition (P) that exhibits a gloss level above 75 gloss units before any weathering exposure, exhibits a color shift dE as measured in reference to the unexposed surface of below dE=6, after being subjected to artificial weathering according to PV3929 for 3200 h, wherein the gloss level is determined according to DIN EN ISO 2813 at a measuring angle of 60°.

9. A method for producing the thermoplastic molding composition (P) according to claim 1, the method comprising at least the following steps:
(i) providing the components (A) to (D) in the predetermined amounts to a mixing device; and
(ii) blending the components (A) to (D) in the mixing device at temperatures above the glass transition point of the components (A) to obtain the molding composition (P).

10. A method for improving weathering resistance on high gloss surface molded articles (T) with gloss levels according to DIN EN ISO 2813 at a measuring angle of 60° above 75 gloss units on at least a part of the surface area of the molded article (T) before being subjected to artificial weathering, wherein the method comprises the step of compounding the constituents (A) to (D) according to claim 1, and wherein the high gloss surface molded article (T) obtained from the molding composition (P) exhibits the following properties:
a color shift of the high gloss surface molded article (T) produced from the molding composition (P) subjected to artificial weathering according to PV3929 for 3200 hours of below 25% of the color shift of a high gloss surface part produced from a comparative molding composition (P') molded and assessed with same conditions,
wherein the comparative molding composition (P') is obtained by compounding the components (A) to (D) contained in the molding composition (P) with a content of polymerized alkyl methacrylate component (A-3) below 20 wt.-% of the comparable molding composition (P').

11. A molded article (T) comprising high gloss surface areas with gloss levels above 75 gloss units prepared from a thermoplastic molding composition (P) according to claim 1, wherein the gloss level is determined according to DIN EN ISO 2813 at a measuring angle of 60°.

12. The molded article (T) according to claim 11, wherein the molded article (T) is an unpainted molded article for exterior applications.

13. The molded article (T) according to claim 12, wherein the unpainted molded article is for automotive applications.

14. The thermoplastic molding composition (P) according to claim 1 comprising:
(A) the at least one thermoplastic polymer composition (A) comprising:
(A-1) 15 to 45 wt.-%, based on the total weight of the molding composition (P), of the at least one graft copolymer (A-1),
(A-2) 5 to 50 wt.-%, based on the total weight of the molding composition (P), of the at least one thermoplastic polymer matrix (A-2), and
(A-3) 25 to 40 wt.-%, based on the total weight of the molding composition (P), of the at least one polymerized alkyl methacrylate component (A-3), (A-3),
where the sum of (A-1), (A-2), and (A-3) is 83.2 to 99.8 wt.-% based on the total weight of the molding composition (P);
(B) the hindered amine light stabilizer composition (B), comprising at least two of substances (B-1) to (B-3):
(B-1) 0.1 to 0.9 wt.-%, based on the total weight of the molding composition (P), of the at least one hindered amine light stabilizer having a dipiperidine structure,
(B-2) 0.1 to 0.9 wt.-%, based on the total weight of the molding composition (P), of the hindered amine light stabilizer mixture having a monopiperidine structure, and
(B-3) 0.1 to 2 wt.-%, based on the total weight of the molding composition (P), of the at least one hindered amine light stabilizer having a polymeric structure,
provided that the at least one hindered amine light stabilizer composition (B) is present in the molding composition (P) in an amount of at least 0.2 wt.-%, based on the total weight of the molding composition (P);
(C) 0.05 to 5 wt.-% of the one or more further additives (C), different from (B); and
(D) 0.1 to 10 wt.-% of the colorants, dyes, and/or pigments (D), different from (C);
wherein the constituents (A) to (D) sum up to 100 wt.-% of the molding composition (P).

* * * * *